US009782243B2

(12) United States Patent
Ritchey et al.

(10) Patent No.: US 9,782,243 B2
(45) Date of Patent: Oct. 10, 2017

(54) ANIMAL RESTRAINT DEVICE AND METHOD

(71) Applicants: Grant A. Ritchey, Hudson, CO (US); Craig E. Ritchey, Brighton, CO (US)

(72) Inventors: Grant A. Ritchey, Hudson, CO (US); Craig E. Ritchey, Brighton, CO (US)

( * ) Notice: Subject to any disclaimer, the term of this patent is extended or adjusted under 35 U.S.C. 154(b) by 0 days.

(21) Appl. No.: 13/871,833

(22) Filed: Apr. 26, 2013

(65) Prior Publication Data

US 2013/0233253 A1  Sep. 12, 2013

Related U.S. Application Data

(60) Division of application No. 12/791,318, filed on Jun. 1, 2010, now Pat. No. 8,448,609, which is a
(Continued)

(51) Int. Cl.
*A01K 15/04* (2006.01)
*A61D 3/00* (2006.01)

(52) U.S. Cl.
CPC ............... *A61D 3/00* (2013.01); *A01K 15/04* (2013.01); *A61D 2003/003* (2013.01)

(58) Field of Classification Search
CPC .......... A01K 9/00; A01K 9/005; A01K 15/04; A01K 7/00; A01K 37/00; A01K 13/00; A61D 2003/003; A61D 3/00
(Continued)

(56) References Cited

U.S. PATENT DOCUMENTS 400,277 A   1/1884   Felt
291,177 A   3/1889   Walz
(Continued)

OTHER PUBLICATIONS

Cleo, "How to feed your cat", 2008.*
(Continued)

*Primary Examiner* — Thien Thanh Pham
(74) *Attorney, Agent, or Firm* — Brent P. Johnson; Berg Hill Greenleaf Ruscitti LLP

(57) ABSTRACT

An animal restraining device and method provide dual capability for restraining an animal and administering medications. A first embodiment provides an administration tube connected to a body with handles which can be grasped by user to position the device either for restraining or administering medications. A second embodiment is a continuous hook-shaped member having a hollow passageway in order to introduce medications. The second embodiment is reversible to place either end of the device in the animal's mouth for restraining or administering medications, depending upon the size of the particular animal. The method of restraint includes positioning the device in the animal's mouth and applying a force to elicit a natural response by the animal which causes the animal to pause or remain motionless for a period of time while a caregiver may treat or examine the animal. Third and fourth embodiments of the device include opposing hook portions that can be used to hook or secure the leg of an animal prior to administering medications. The opposing hook portion has an end opposite curvature as opposed to the hook or curved form between the administration tube and body of the first embodiment, and an opposite curvature as compared to the hook shaped second embodiment.

5 Claims, 7 Drawing Sheets

Related U.S. Application Data continuation-in-part of application No. 12/684,737, filed on Jan. 8, 2010, now abandoned.

(58) Field of Classification Search
USPC ........ 119/72, 72.5, 712, 801, 802, 803, 804, 119/71, 51.01, 51.03; 604/240, 241, 243, 604/244
See application file for complete search history.

(56) References Cited

U.S. PATENT DOCUMENTS

| | | |
|---|---|---|
| RE12,388 E | 9/1905 | Bins |
| 1,208,624 A | 12/1916 | Newman |
| 1,241,952 A | 10/1917 | French |
| 1,496,132 A | 6/1924 | Rombough |
| 2,604,069 A | 9/1950 | Hobby |
| 3,757,781 A | 9/1973 | Smart |
| 3,774,608 A | 11/1973 | Wohler, Jr. |
| 3,863,377 A | 2/1975 | Leonard |
| 3,934,584 A | 1/1976 | Corio |
| 4,050,460 A | 9/1977 | Magrath |
| 4,059,111 A | 11/1977 | Erasmus |
| 4,613,323 A | 9/1986 | Norton et al. |
| 4,637,816 A | 1/1987 | Mann |
| 4,773,898 A | 9/1988 | Begouen |
| 4,874,365 A | 10/1989 | Frederick et al. |
| 5,116,314 A * | 5/1992 | Inabinet ............ A61D 7/00 604/77 |
| 5,156,593 A | 10/1992 | Green |
| 5,494,283 A | 2/1996 | Harris |
| 5,566,645 A | 10/1996 | Cole |
| 5,630,381 A | 5/1997 | Kroyer |
| 5,809,939 A | 9/1998 | Robart et al. |
| 5,893,799 A | 4/1999 | Studley, Jr. et al. |
| 5,927,562 A | 7/1999 | Hammen et al. |
| 5,960,747 A | 10/1999 | Heil |
| 6,007,335 A * | 12/1999 | Sheu ................. 433/90 |
| 6,071,264 A * | 6/2000 | Castor ............... A01K 7/00 119/71 |
| 7,028,640 B1 | 4/2006 | Cummings |
| 7,135,010 B2 | 11/2006 | Buckman et al. |
| 7,360,501 B2 | 4/2008 | Jacobsen |
| 7,611,413 B2 | 11/2009 | Ryan et al. |
| 7,611,504 B1 | 11/2009 | Faries, Jr. et al. |
| 7,621,903 B2 | 11/2009 | DeLegge |
| 8,448,609 B2 | 5/2013 | Ritchey et al. |
| 2001/0032444 A1 | 10/2001 | Baugher |
| 2002/0148852 A1 * | 10/2002 | Schultz ............. A61J 7/0053 222/78 |
| 2005/0224004 A1 | 10/2005 | Jacobsen |
| 2007/0106229 A1 | 5/2007 | Wong |
| 2007/0161952 A1 | 7/2007 | Faries et al. |
| 2009/0090743 A1 | 4/2009 | Ostermeier et al. |
| 2011/0062189 A1 | 3/2011 | Kapec et al. |
| 2011/0068122 A1 | 3/2011 | Barker |
| 2011/0172641 A1 | 7/2011 | Ritchey et al. |

OTHER PUBLICATIONS

Advice Needed! on giving a cat liquid medicine.—Democratic Underground, 2003.*
Feeding Techniques, 2003.*
Feline Squamous cell carcinoma-syringe feeding instructions, 2002.*
Force feeding, 2007.*
Help with cat—vomiting and won't eat, 2008.*
How to Pill a Cat, 2009.*
U.S. Appl. No. 29/451,298, filed Mar. 29, 2013, Ritchey et al.
U.S. Appl. No. 13/890,952, filed May 9, 2013, Ritchey et al.
International Search Report for International (PCT) Patent Application No. PCT/US2010/037931, mailed Aug. 3, 2010.
International Preliminary Report on Patentability and Written Opinion for International (PCT) Patent Application No. PCT/US2010/037931, mailed Jul. 19, 2012, 9 pages.

* cited by examiner

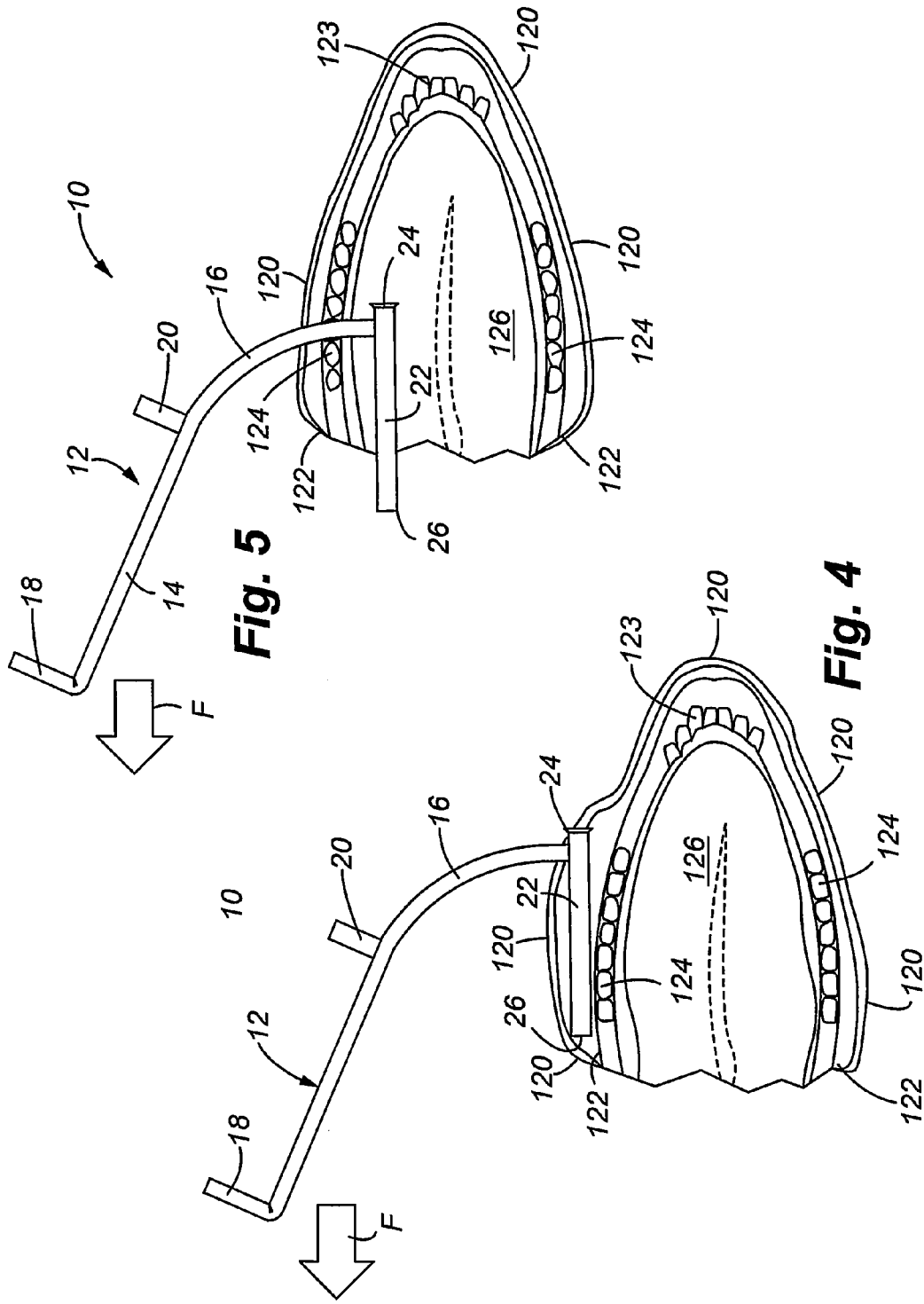

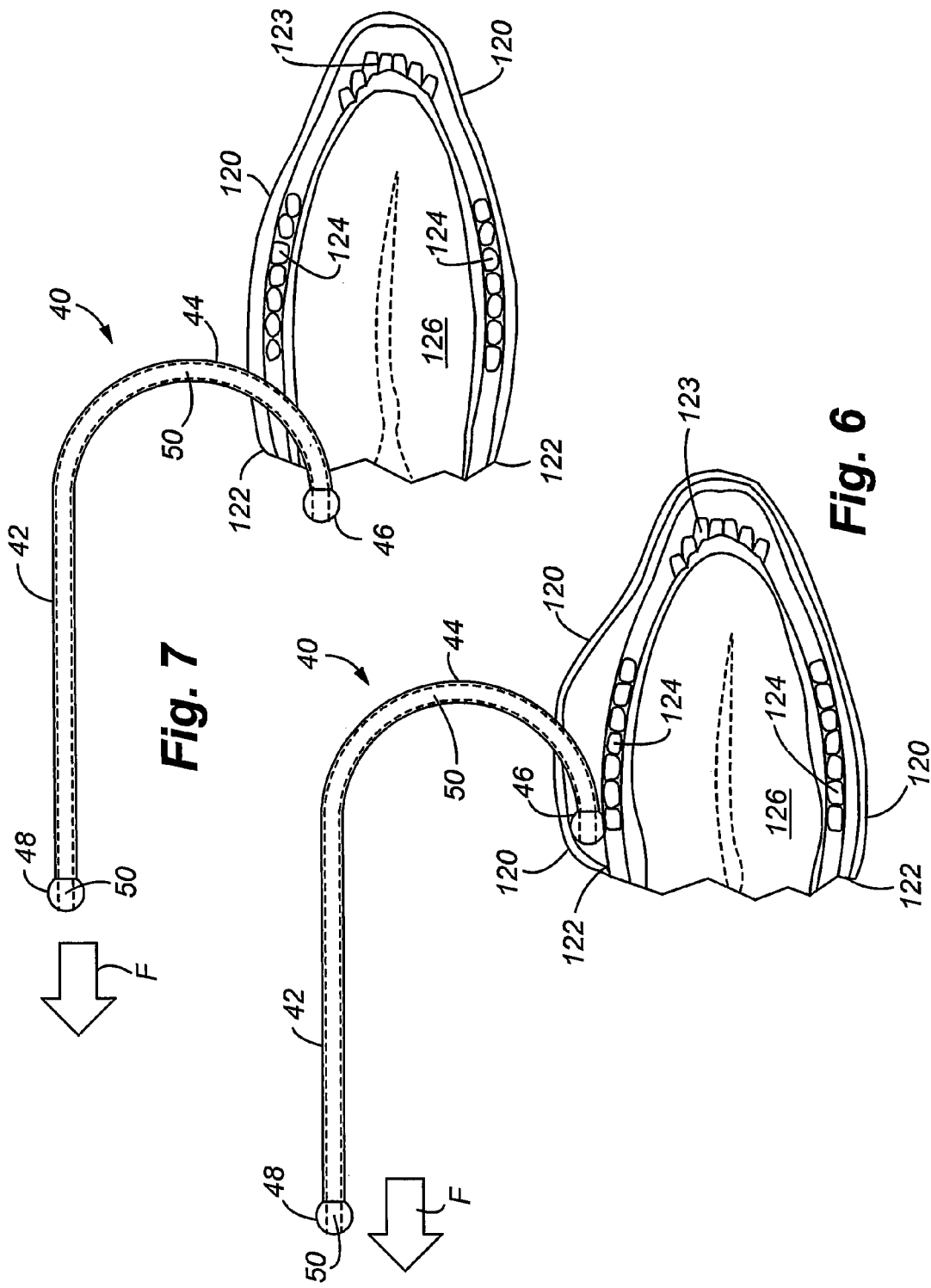

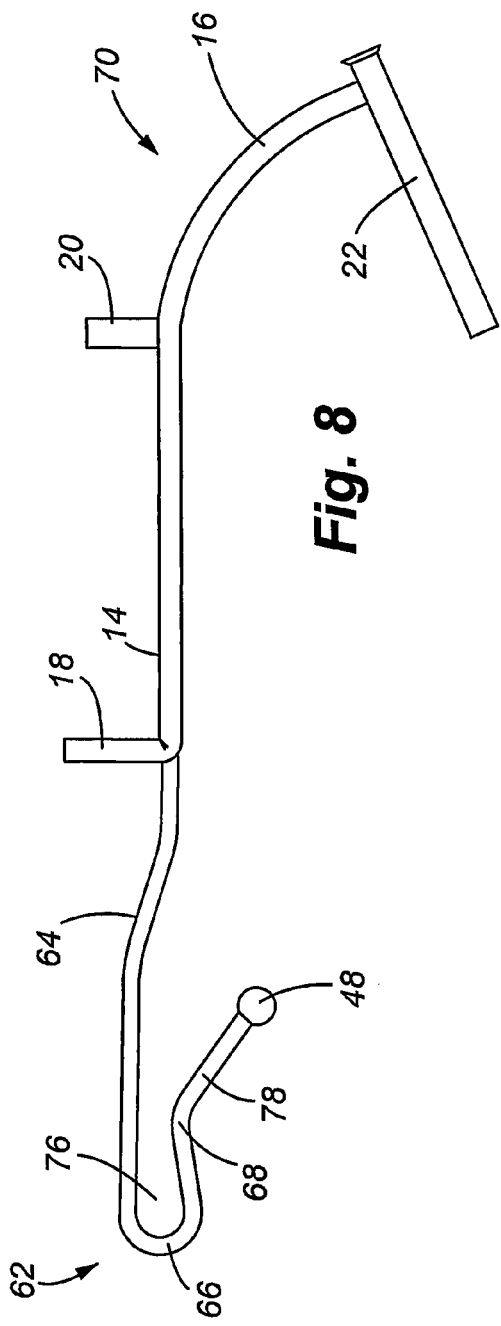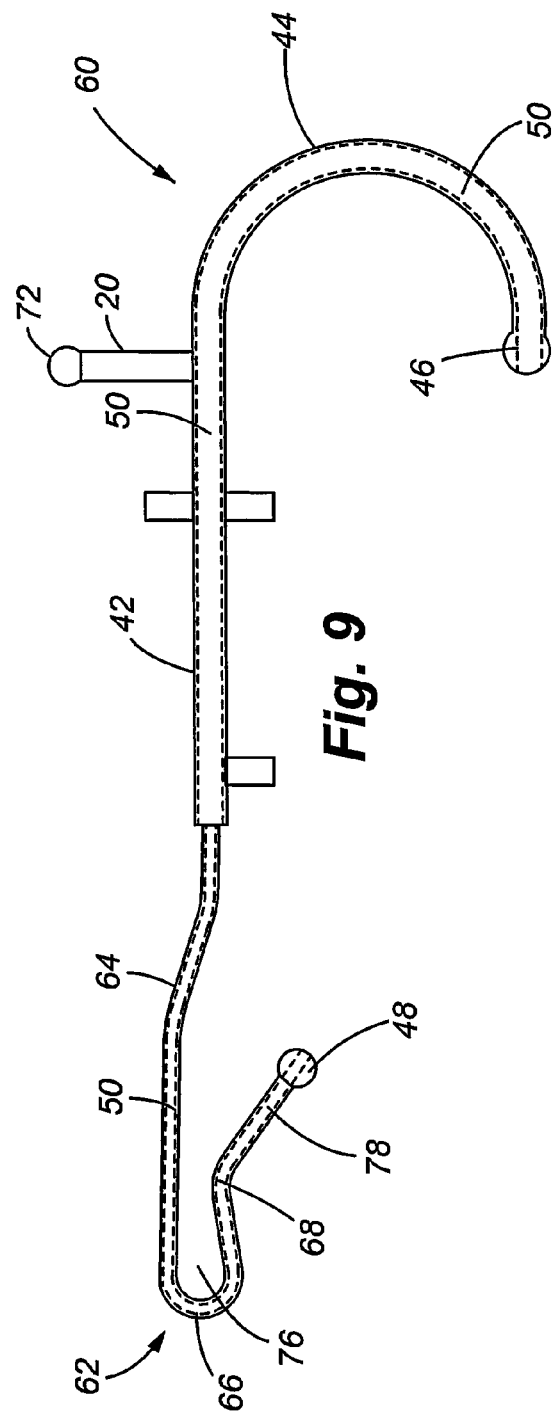

ANIMAL RESTRAINT DEVICE AND METHOD

CROSS REFERENCE

This application is a divisional application of co-pending application Ser. No. 12/791,318 filed on Jun. 1, 2010, entitled "ANIMAL RESTRAINT DEVICE AND METHOD" which is a continuation-in-part application of co-pending application Ser. No. 12/684,737, filed Jan. 8, 2010, entitled "ANIMAL RESTRAINT DEVICE AND METHOD" each of which are incorporated herein by reference in their entireties.

FIELD OF THE INVENTION

The invention generally relates to devices and methods used to restrain animals such as livestock, and more particularly, to an animal restraint device and method in which livestock can be restrained for purposes of treatment and evaluation by caregivers. The device is hand-held for placement within the animal's mouth to restrain the animal, and the device also providing a feature for administering medications to the animal.

BACKGROUND OF THE INVENTION

Domestic animals to include livestock such as cattle, sheep, and horses must undergo periodic medical evaluations and treatments to maintain the animals in optimum health. While horses may be easier to medically examine without restraint, other domesticated animals such as cattle, are more difficult to examine and treat without confining the animal within a cattle chute.

There are a number of inventions in the field of cattle chutes for purposes of restraining animals. Many newer chute designs are particularly directed to capturing and holding the head of the animal so that a caregiver may conduct a medical examination and/or administer medications.

One principle drawback to many cattle chutes is that they are relatively expensive for purchase by many cattle growers, particularly in developing countries. Therefore, most cattle growers in those developing countries do not have access to cattle chutes that are capable of immobilizing the head of the animal. Another drawback to many cattle chutes is that an animal's natural instinct is not to be confined and therefore, the animal can be injured as it struggles to free itself from capture. Yet another drawback with many cattle chutes is the inability to administer solid or liquid medications without the use of an esophagus probe since the animal may otherwise not cooperate in opening its mouth and swallowing the medication.

One example of a prior art device for administering medications is disclosed in U.S. Pat. No. 5,156,593. This invention provides an esophagus probe for delivery of treatment doses of material to animals such as livestock directly into the animal's esophagus. The probe is characterized by a hook-shaped conduit that has a straightened mouth insert portion or stem, a U-shaped metal portion, and a handle portion. The mouth insert portion terminates in a delivery nozzle. The handle connects to a flexible hose which in turn connects to a containment vessel containing a nutrient or medicament material to be dispensed, such as by a pump.

U.S. Pat. No. 4,050,460 discloses a liquid feed injector for young animals and particularly calves. The injector includes a collapsible reservoir and a rigid probe or feed tube connected by a relatively short length of flexible tubing. A fitting or closure cup for the reservoir has an outlet nipple about which the flexible tube is attached. The flexible tube acts as a shut-off valve during manipulation for placing the tube in the animal's throat. The reservoir may be flattened or rolled during discharge of the fluid.

The U.S. Pat. No. 4,773,898 discloses a device for orally administering treatment liquids to animals. The device comprises a hollow loop serving as a flow conduit between a container of treatment liquid and a flexible nozzle mounted on one side of the loop adapted to direct a jet flow of the liquid toward the back of the animal's throat. The loop has a geometry close to that of an equilateral triangle, the corners of which adjacent the side that carries the nozzle being rounded whereby the loop may be clamped firmly on the nose of the animal without inflicting pain.

In addition to devices that may be used to administer liquid or solid medicaments to animals, there are also a number of prior art devices that may be used to control the movement of an animal. U.S. Pat. No. 5,960,747 discloses an animal leg catching device for catching an animal by the leg including a pole and first and second U-shaped members. The free end of a first arm portion of the first U-shape member is inserted into a distal end of the pole. A first arm portion of the second U-shaped member is rotabably coupled to a second arm portion of the first U-shaped member at a point on the first arm portion of the second U-shaped member adjacent to cross portion of the second U-shaped member. The ends of a resiliently elastic strap are coupled to the first arm portion of the first U-shaped member such that the elastic strap forms a generally U-shaped loop. One end of a flexible cable is coupled to the elastic strap at the loop of the elastic strap. While this invention may be adequate for controlling the legs of an animal, the device does not also have the capability to administer medicaments to the animal.

While these inventions may be adequate for their intended purpose, there is still a need for a device that can be used to not only to administer medications to an animal, but also provides a means to control the animal without requiring the animal's head to be captured within a restraining assembly of the chute, as found in the more complex and expensive cattle chutes. There is yet another need to provide a manually operated restraining device that is effective, simple to use, and provides a degree of safety for both the user and the animal. These needs and other advantages of the present invention are described in detail below in reference to the device and method of the present invention.

There is also a need for a device that provides a means to first control the animal without having a user hold the device, but the device may then be subsequently used to administer medications to an animal.

SUMMARY OF THE INVENTION

The present invention provides a device and method for restraining an animal, as well as a device and method for administering medications or to otherwise treat an animal.

In a first embodiment of the invention, a hand-held device is provided including a body with a pair of handles that are grasped by the user. The body includes a linear or straight portion, and a forward curved portion. Forward and rear handles are formed on the curved and straight portions, respectfully. A reverse projecting administration tube attaches to the forward curved portion of the body. The administration tube and body are connected at an angle that facilitates the user being able to stand in a position to easily insert the administration tube into the animal's mouth, and then to apply a force to the device to lodge the administration tube at a selected location in the animal's mouth.

One important principle of the present invention is the effect that the administration tube has upon the animal. The administration tube is of a selected length so that the distal end of the tube can be placed at two advantageous functional positions. The first position is placement of the tube distal end between the lips and back teeth at the corner of the animal's mouth. The second position is placement of the tube distal end at the base of the animal's tongue at the entrance of the throat, but not within the esophagus. Placement of the device in the first position coupled with application of a directed force by the user to forcibly lodge the tube distal end in the corner of the animal's mouth elicits a natural response from the animal to pause and be still. This pause reaction by the animal causes the animal to cease moving or thrashing, allowing a caregiver to conduct an examination or to otherwise treat or observe the animal. Placement of the device in the second position coupled with the application of force elicits a similar response from the animal, however more of a gagging response in which the animal will also cease from violent thrashing. In the second position, the tube is presented at an advantageous location in the animal's mouth for administration of solid or liquid medicaments. In either position, placement of the administration tube results in the animal maintaining a temporary still or pre-occupied state which provides a caregiver enough time to either administer medications through the administration tube, or to examine the animal.

Because the device is manually operated, the user can apply a selected amount of force to settle the animal based upon the disposition of the particular animal. The angle between the administration tube and body provides an adequate offset orientation for the user such that the user does not have to place any part of his/her body within the chute which is quite advantageous for safety purposes. The user can stand away from the animal a safe distance yet can easily apply the necessary force to elicit the pause response from the animal.

In another embodiment of the present invention, the device takes the form of a hollow U-shaped member in which a distal end of the device is selectively placed in either the first or second position. If it is desired to administer medications, then the material is passed through the entire length of the device, since the device is a hollow tubular member. Both ends of the device may have an attached enlargement, such as a bulbous tip. The bulbous or blunt tip helps to prevent injury to the animal, as well as to provide a handle or gripping means for the user. This second embodiment is reversible, meaning that either end of the device may be inserted within the mouth of the animal, depending upon the depth to which the device must be placed within the animal to correctly place the device in the animal's mouth. Therefore, two sizing options are provided in the second embodiment with reference to the depth to which the device is inserted in the animal's mouth.

According to the method of the first and second embodiments of the present invention, a manually operated device is manipulated by the user to place the device within a desired location in the animal's mouth. The user applies a force, generally in a rearward direction to capture the attention of the animal for purposes of administering medications, or to otherwise settle the animal for examination purposes.

In accordance with another preferred embodiment of the present invention, the hand held device includes an opposing hook portion formed at the end opposite of the reverse projecting administration tube. This opposing hook portion can be used to capture the leg of the animal, while the end of the device having the administration tube can be secured to an object, such as a fence post, to initially control the animal in preparation for treatment of the animal. The orientation of the administration tube forms a hook enabling it to be secured to an object such as the fence post.

In yet another embodiment of the present invention, the opposing hook portion may also be incorporated on the opposite end of the embodiment having the hollow U-shaped member. In this embodiment, the opposing hook portion forms an extension that is also hollow, enabling medications to be administered through the opposing hook portion, and out the opposite end through the opening formed at the distal end of the U-shaped member. In this embodiment, the opposing hook portion can be secured to the animal's leg, while the U-shaped member at the opposite end may be secured, for example, to an object such as a fence post.

According to the method of the third and fourth apparatus embodiments, the device is used to capture the animal by routing the opposing hook portion around the leg of the animal and securing the opposite end of the device to an object to hold the animal. After the animal has been captured and held still, the device can be removed from the around the animal's leg, and placed in the animals mouth to administer medications through the administration tube, or through the hollow channel of the device.

Other features and advantages of the present invention will become apparent from the following detailed description, taken in conjunction with the accompanying figures that illustrate by way of preferred embodiments, the basic principles of the present invention.

BRIEF DESCRIPTION OF THE DRAWINGS

FIG. 4 is another plan view of the device of the present invention illustrating its placement in an animal's mouth in the first position as defined between the lips and back teeth of the animal at the corner of the mouth;

FIG. 5 is another plan view of the device illustrated in the second position at the base of the animal's tongue at the entrance to the throat;

FIG. 6 is a plan view of a second embodiment of the device of the present invention, and illustrating the device in the first position; and FIG. 7 is another plan view of the second embodiment illustrating the device placed in the second position.

FIG. 8 is a plan view of a third embodiment of the present invention illustrating the first embodiment formed at one end of the device, and an opposing hook portion formed at the opposite end of the device;

FIG. 9 illustrates a plan view of a fourth embodiment of the present invention showing the second embodiment formed at one end of the device, and an opposing hook portion formed at an opposite end of the device.

DETAILED DESCRIPTION

Figure 1:
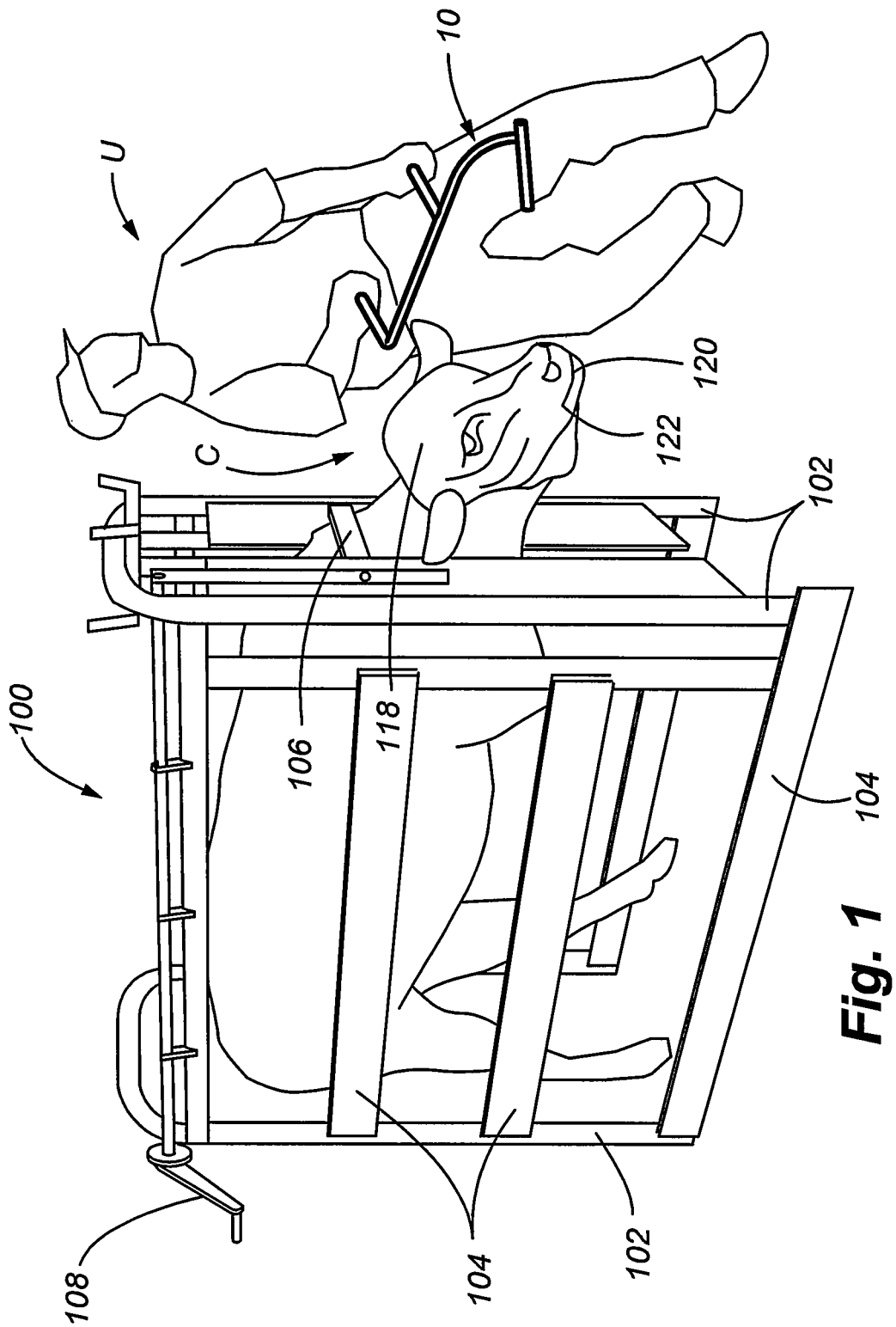
FIG. 1 is a perspective view of an animal placed within a restraining assembly, such as a cattle chute, and a user holding the device of the present invention in preparation for use of the device.

FIG. 1 shows the device 10 of the present invention as held by a user U. As explained in further detail below, the device 10 can be grasped by the user with both hands placed on handles of the device. FIG. 1 also illustrates for background purposes, a standard cattle chute 100 that can be used to restrain an animal, such as a cow C. The cattle chute 100 typically comprises of a plurality of support members including vertical supports 102 and side slats or supports 104. An optional movable cross bar restraint 106 is used to capture and partially immobilize the animal's head as shown. An operating crank 108 can be used to operate various parts of the cattle chute to include the opening and closing of the chute, operation of the cross bar restraint, etc. The type of chute intended to be shown in this figure is one in which the animals head is not completely immobilized, and while the head may be partially restrained, the head is still free to move in a fairly wide range of motion. This type of chute is typical for many of the more simple and less expensive chutes as compared to more complex and expensive chutes in which a robust head capture assembly is used to capture the animal's head. Therefore, the cattle chute 100 represents a very simple cattle chute construction, but it shall be understood that the present invention is not limited by use of the device with any particular cattle chute. As mentioned, there are a number of more complex cattle chute constructions, to include those which completely capture and immobilize the animal's head. One particular advantage of the present invention is that the device 10 can be used even with the simplest forms of cattle chutes to provide effective results in restraining the animal.

Figure 2:
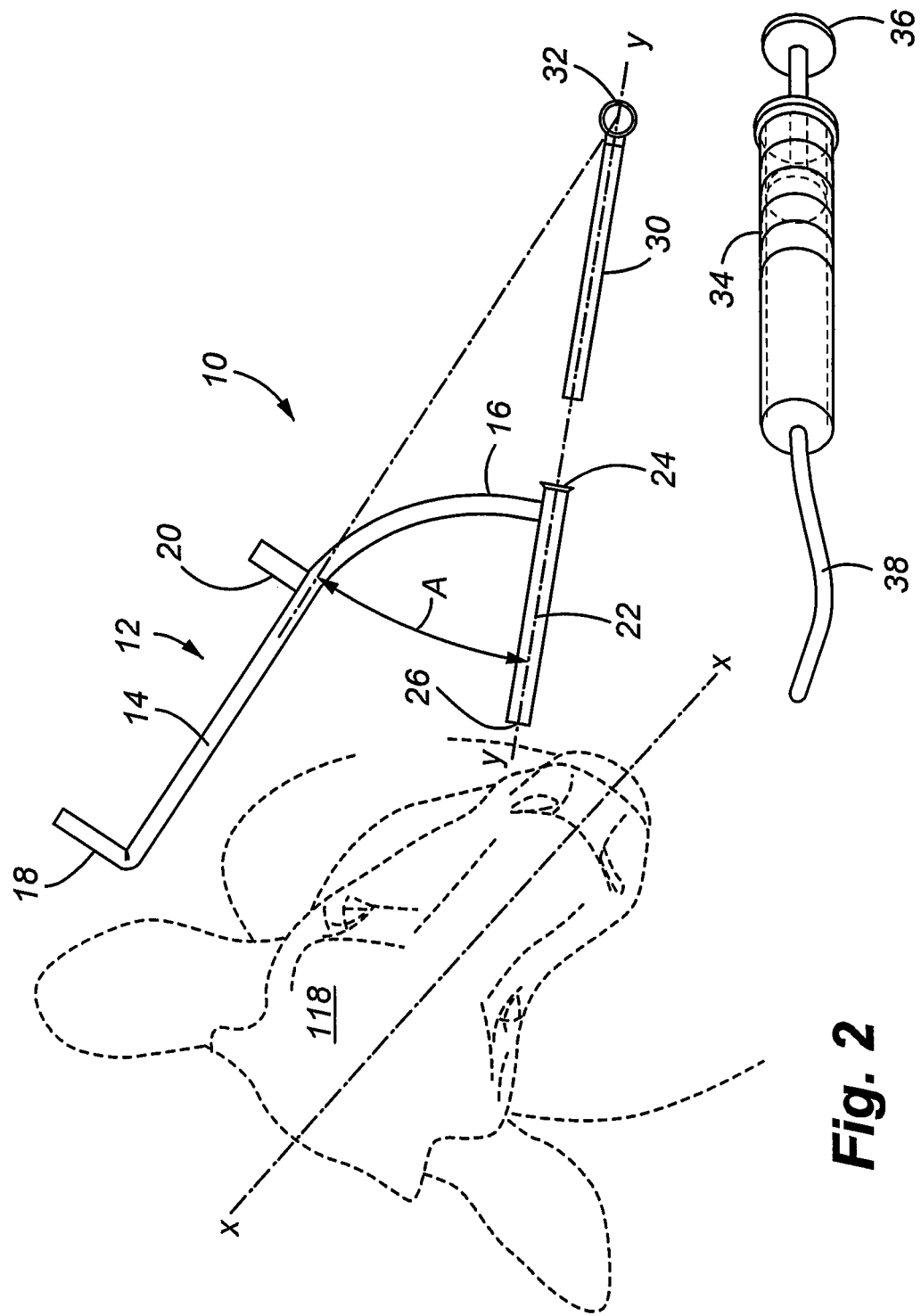
FIG. 2 is a plan view of the device in a first embodiment of the present invention, and its orientation with respect to the head of an animal that is to receive the device.

Referring to FIG. 2, the device 10 is shown in the first embodiment. The device 10 comprises a body 12 having two primary components, namely, a straight or linear portion 14, and a forward curved portion 16. As shown, portions 14 and 16 are continuous. A rear handle 18 is formed at a rear end of the device, and a forward handle 20 protrudes from the body 12 at a location essentially bisecting the straight portion 14 and curved portion 16. The body may be made of a steel tubular member or bar in which the handle 18 is formed by bending the end of the tube. Other materials can also be considered such as plastic or fiberglass. The forward handle 20 may be a separate piece welded to the body. A reverse projecting administration tube 22 connects to the free end of the forward curved portion 16. The administration tube 22 can also be formed from a steel tubular member. The administration tube has a proximal end 24 which may receive implements for administering medications, as further explained below. The distal end 26 of the administration tube is placed at a desired location within the animal's mouth. The straight portion 14 extends at a desired angle A with respect to the axis y-y of the administration tube 22. This angle A enables a user to be offset from the animal a safe distance, yet still allows the user to apply an effective rearward force once the device is placed in the animal's mouth. This angle A may be, for example approximately 25 degrees.

Figure 3:
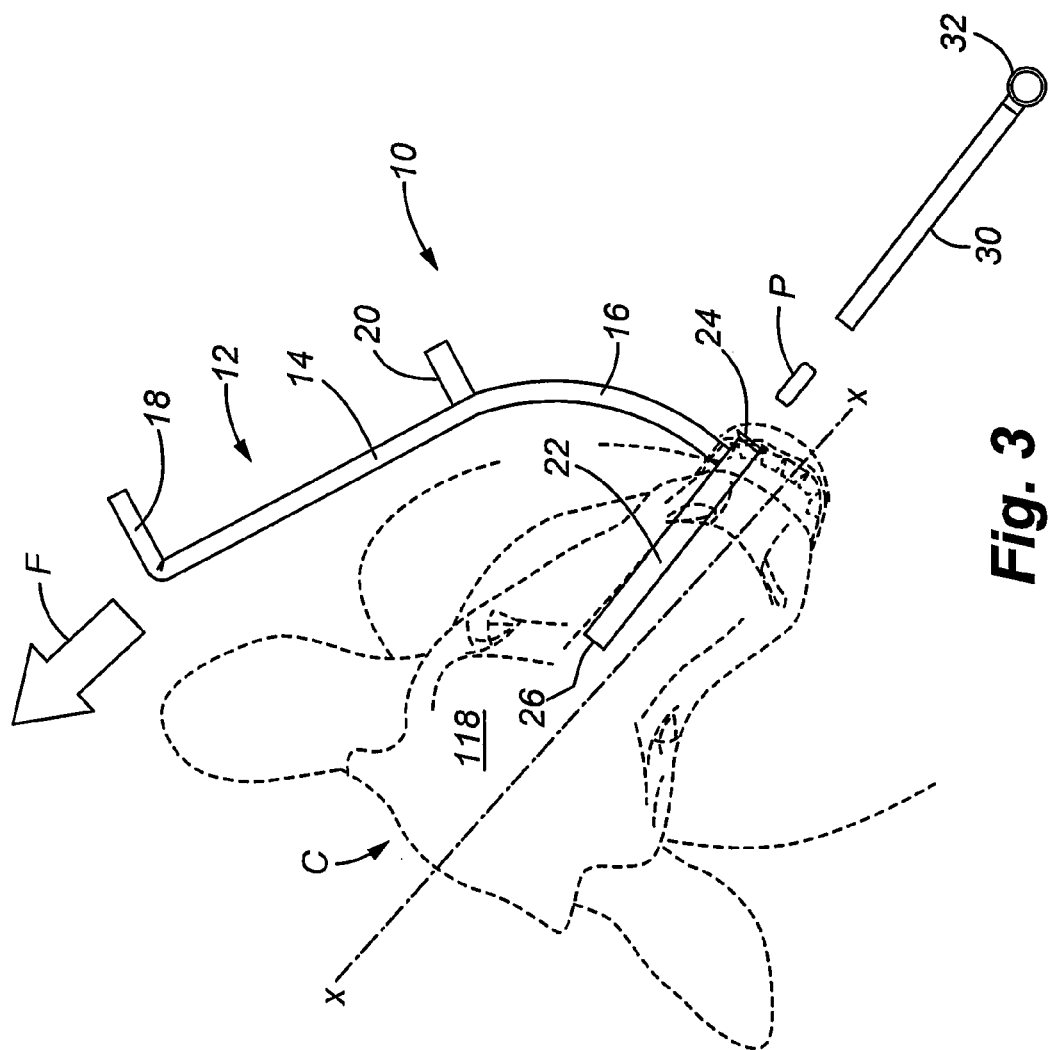
FIG. 3 is another plan view of the device as it is placed within an animal's mouth, illustrating particularly the orientation of the device with respect to a longitudinal axis of the animal's head.

FIG. 2 also shows two implements which can be used with the device 10 to administer medications. One of the implements can be, for example, a push rod 30 controlled by handle/loop 32. As shown in FIG. 3, a pill or bolus P can be placed through the proximal end 24, and is administered to the animal by inserting the rod 30 through the tube 22 thereby pushing the pill out through the distal end 26 into the animal's mouth. Alternatively, liquid medications can be easily provided by use of a syringe 34 having a flexible tube connected to the discharge end of the syringe. The flexible tube 38 can be inserted through the administration tube 22 to deliver a desired dose by activation of the syringe plunger 36.

FIG. 3 more particularly illustrates the general orientation of the device with respect to the long or longitudinal axis X-X of the animal's head 118. As shown, the tube 22 generally extends parallel to this longitudinal axis X-X. A force F is applied by the user in the direction of the arrow, which is also generally parallel to the axis X-X.

Referring to FIGS. 4 and 5, a cross-sectional view is provided of an animal's lower jaw in order to illustrate the two principal positions of the device in use. The lower jaw as illustrated includes back teeth 124, front teeth 123, lips 120, and corners 122 of the mouth. The tongue 126 extends between the teeth. The first position is shown in FIG. 4 in which the distal end 26 of the administration tube 22 is placed between the facial sides of the back teeth 124 and lip 120 of the animal at the corner of the mouth 122. The positioning of the device 10 at this location elicits the natural response of the animal to pause or be still. This pausing or stillness which the device elicits from the animal allows a caregiver to subsequently examine or otherwise treat the animal. The placement of the device at this location in the animal's mouth also enables the user to apply considerable force F in the rearward direction without harming the animal. The anatomy of a cow's mouth at this location is capable of withstanding the force F without substantially damaging the mouth tissues.

The second principal position of the device is shown in FIG. 5 in which the distal end 26 of the device is placed between the lingual sides of the back teeth and at the back or base of the tongue 126 at the entrance to the throat, but not within the animal's esophagus. This location elicits a gagging response by the animal which also causes the animal to pause or be still allowing the caregiver to conduct his/her work. At the appropriate time, if medications are to be provided, the device may be placed in this second position and the push rod or syringe can be used to administer the medications or nutrients. Because the medication/nutrient will enter the animal's mouth at the back of the tongue at the entrance to the throat, the animal will not be capable of spitting up the medication and the medication will travel naturally through the throat into the animal's esophagus. It should be understood that the device can be placed at either side of the mouth at either corner 122 thereby providing the user a choice on which side of the animal to stand.

Unlike many prior art esophagus probes that place a tube in the esophagus to deliver medications, the present invention provides increased safety for the animal because the device is much less intrusive, and does not involve potential damage to the animal's esophagus and throat by misplacement of the device. Use of the device elicits a natural response from the animal to cause the animal to be preoccupied and still, which further enhances the ability to easily administer medications to the animal. The embodiment of FIGS. 4 and 5 provides an additional advantage in that the medication only has to travel through a very short distance within the device, namely, the administration tube 22, as opposed to having to pass through the entire length of the device as is the requirement in many prior art devices.

Referring to FIGS. 6 and 7, a second embodiment of the invention is shown as device 40. In the second embodiment, the device is U shaped or hook shaped, with one end or leg of the U shape extending beyond the other leg. The device 40 is hollow and has a continuous passageway 50 that extends through the device. The device can be made from tubular steel or another selected material such as reinforced plastic or fiberglass. The device has a straight or linear portion 42, and a curved portion 44 that may traverse an angle of approximately 180 degrees. The device has blunted ends as provided by bulb-shaped attachments 46 and 48 secured at each end of the device. A bore extends through each of the attachments for mounting of the attachments to the ends of the device. The attachments 46 and 48 have two functions. The attachment placed in the mouth helps to prevent damage to the mouth tissue by providing a blunt and smooth surface in contact with the tissue. The opposite attachment serves as a handle for grasping by the user. The passageway 50 may receive a flexible tube, such as tube 38 attached to a syringe, to administer liquid medicaments. If a solid medication such as a bolus is to be administered, the bolus can be introduced through the passageway 50 by use of a flexible rod (not shown) inserted through the passageway 50 to push the bolus out through the opposite end of the passageway.

FIG. 6 illustrates the device 40 in the first position, while FIG. 7 illustrates the device 40 in the second position. The same principals apply to use of the device 40 as discussed with respect to the device 10 in terms of the advantages of the placement of the device, and the natural reaction of the animal. The embodiment of FIGS. 6 and 7 provides a somewhat more structurally simple design as compared to the first embodiment. The device 40 is reversible in that the user has two sizes to choose from in terms of which end to place in the animal's mouth. The length of the straight portion 42 can be adjusted to set two common sizes for use with particular animals, such as calves and adult cows. As also shown, the straight portion 42 remains outside of the mouth.

According to the method applicable to the first and second apparatus embodiments of the present invention, the device is grasped by the user U, and the user works the distal end of the device into the animal's mouth and places the device preferably in either of the first or second positions. If it is only necessary to restrain the animal, then the user may choose the first position. If the user wishes to administer medications, then the user may choose the second position. The user grasps the handle(s) of the device at an offset location with respect to the cattle chute and applies the necessary force F to lodge the device in the animal's mouth, and to elicit the pause reaction from the animal to maintain the animal in a preoccupied state. The user may also position and reposition the device between the first and second positions depending upon the treatment being provided to the animal.

The device and method of the present invention provide a simple, yet effective means to control an animal during treatment and evaluation. The device can be used with any type of cattle chute, and is easily manipulated by a user in a safe manner. The first embodiment provides two handles, and a protruding administration tube for introducing medications through a relatively short passageway. The second embodiment provides a somewhat simpler construction and a reversibility option in that either end of the device can be inserted within the animal's mouth depending upon the size and type of animal.

Referring to the plan view of FIG. 8, another device 70 is illustrated that is the same as the device illustrated in the first embodiment, but further including an opposing hook portion 62 that can be used to capture the animal's leg. As shown, the opposing hook portion 62 forms an extension located at the rear handle 18. The hook portion 62 includes an off-set extension 64, a rear curved portion or hook 66, and a linear or straight end extension 78. The rear hook or curved portion 66 is configured so that the free end 68 of the rear hook portion 66 is spaced closer to the off-set extension 64 thereby forming a constriction or narrowing gap as compared to the gap located on both sides of the end 68. A gap or space 76 receives the leg of the animal. The free end of the extension 68 may include a bulb shaped attachment 48. The other reference numbers shown for the device 70 correspond to the same elements in the first embodiment, namely, straight portion 14, forward curved portion 16, rear handle 18, forward handle 20, and the administration tube 22.

Referring to FIG. 9, a fourth embodiment of the device 60 is illustrated in which the second embodiment further includes the attached hook portion 62. In this embodiment, the hook portion 62 may also be hollow thereby creating a continuous passageway 50 through the entire length of the device enabling medications to be administered through an opening in the bulb shaped attachment 48 and into the passageway 50. In this embodiment, the straight or linear portion 42 includes a forward handle 20. The free end of the forward handle 20 may include a bulb-shaped attachment 72. To facilitate a user's grasp on and control over the device 60, the straight or linear portion 42 may further include a rear handle 18 and a middle handle 74. The other reference numbers shown for the device 60 correspond to the same elements of the other embodiments, namely, off-set extension 64, a rear curved portion or hook 66, a free end 68, and a linear or straight end extension 78.

Figure 10:
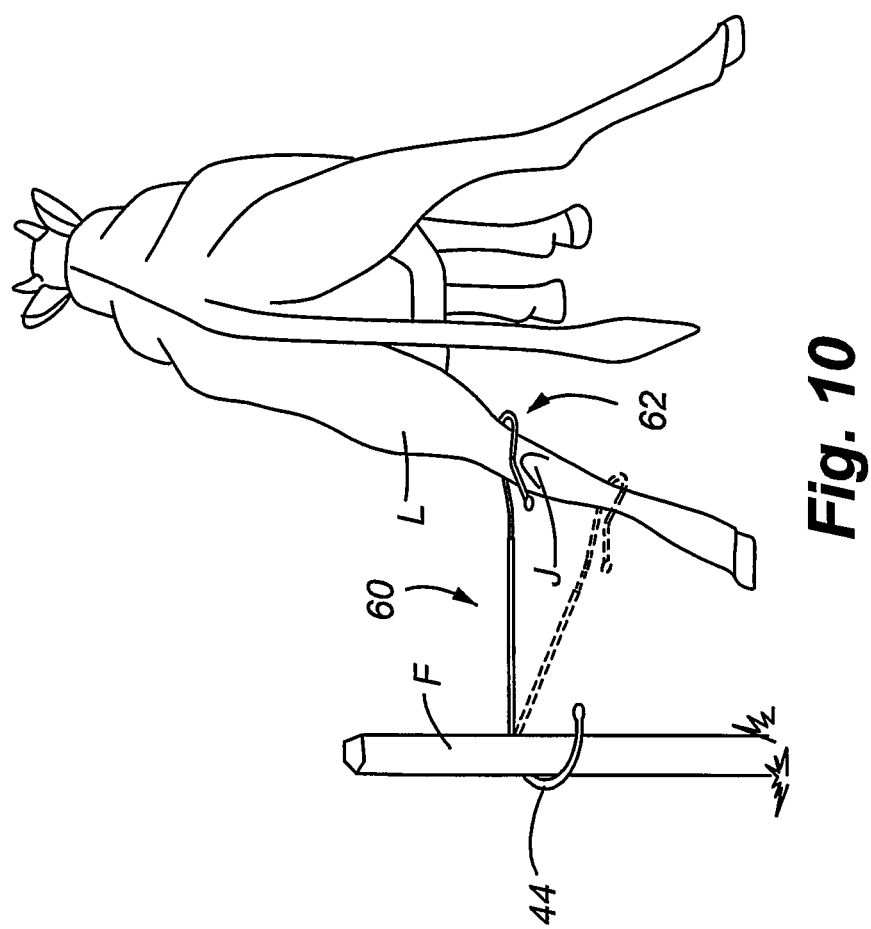
FIG. 10 is a perspective view illustrating the embodiment of FIG. 9 with the opposing hook portion secured to an animal's leg, and the opposite administration portion of the device secured to a fence post.

FIG. 10 illustrates the fourth embodiment of FIG. 9 in which the opposing hook portion 62 has been secured to the leg L of an animal, and the opposite end of the device secures the hook portion 44 to an object such as a fence post F. The gap 76 within the curved portion 66 can be adapted so that when the hook portion 62 is released, the gap 76 is small enough to be held above the protruding bone joint J of the animal thereby keeping the hook portion in place without falling to the ground. In order to attach the hook portion 62 to the animal's leg L, the user may grasp the offset extension 64 with one hand, and with the other hand grasp the linear extension 78 and pull the extension 78 away from the offset extension 64, thereby widening the gap between the extension 68 of the curved portion and the offset extension 64. Once placed over the animal's leg, the opposing hook portion returns to its normally un-deformed shape, thereby closing the gap between the extension 68 and offset extension 64.

Preferably, the hook portion 62 is made of a resilient material which enables a user of moderate strength to be able to pull the end extension 78 away from the offset extension 64. The material may be, for example, a thermoplastic or a metallic material.

The invention also contemplates simultaneous use of two devices. One device can be used to hold the animal's leg, while another device can be placed in the animal's mouth to still the animal and/or to administer medicaments.

Although the third and fourth embodiments of FIGS. 8 and 9 do not illustrate these embodiments in combination with a push rod 30, or a syringe 34 and flexible tube 38, it should be understood that these devices for administering medications through the devices can used in the same manner as describe with respect to the other embodiments. For example, a flexible push rod may be routed through the hollow interior of the device to administer a pill to an animal, or a flexible tube may be placed into the hollow interior of the device to administer a liquid medicament.

Although the invention has been described particularly with respect to cattle, it shall be understood that the device can be used with any animal to include sheep, goats, horses, or even other domesticated or wild animals. It is believed that most animals will exhibit some form of the pause response once the device is placed in the mouth.

While the present invention has been sent forth with respect to preferred embodiments, it shall be understood that various other changes and modifications to the invention can be made within the spirit and scope of the invention commensurate with the scope of the claims appended hereto.

The invention claimed is:

1. A method of restraining an animal for purposes of treatment, evaluation or observation, said method comprising:
providing a device having a curved body, forward and rear handles disposed on said body, an administration tube having proximal and distal ends, and connected to said curved body between said proximal and distal ends, said administration tube being offset from said curved body at an angle;
grasping said forward and rear handles;
placing the distal end of the administration tube in a mouth of the animal and not in an esophagus of the animal;
positioning the distal end of the administration tube in a first position between a lip located at a corner of the animal's mouth and facial sides of corresponding back teeth located at the corner of the animal's mouth; and
applying a force to the device in a rearward direction to obtain the animal's attention and to occupy the animal while the device remains within the animal's mouth in the first position.

2. A method as claimed in claim 1, further including:
placing the distal end of the administration tube in a second position between lingual sides of the back teeth at a base of the animal's tongue, thereby enabling administration of a solid or liquid medicament through the administration tube into the animal's mouth.

3. A method, as claimed in claim 1, further including:
administering a solid medication by placing solid medication within the administration tube, and transporting the medication through the administration tube into the animal's mouth by a push rod inserted through the proximal end of the administration tube and pushing the medication out the distal end of the tube.

4. A method as claimed in claim 1, further including:
administering a liquid medicament to the animal by providing a syringe with a flexible tube connected to a dispensing end of the syringe, placing the flexible tube through the administration tube, and activating the syringe to deliver the fluid through the flexible tube and into the animal's mouth.

5. A method as claimed in claim 1, wherein:
said distal end of said administration tube during use remains in the mouth of the animal and is not placed within the esophagus of the animal.

* * * * *